(12) United States Patent
Uetake

(10) Patent No.: US 12,466,083 B2
(45) Date of Patent: Nov. 11, 2025

(54) HOLDING DEVICE, HOLDING METHOD, AND STORAGE MEDIUM

(71) Applicant: TOYOTA JIDOSHA KABUSHIKI KAISHA, Toyota (JP)

(72) Inventor: Reoto Uetake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 18/200,108

(22) Filed: May 22, 2023

(65) Prior Publication Data

US 2024/0033945 A1 Feb. 1, 2024

(30) Foreign Application Priority Data

Jul. 28, 2022 (JP) .................. 2022-120976

(51) Int. Cl.
*B25J 13/08* (2006.01)
*B25J 9/16* (2006.01)

(52) U.S. Cl.
CPC ........... *B25J 13/082* (2013.01); *B25J 9/1612* (2013.01)

(58) Field of Classification Search
None
See application file for complete search history.

(56) References Cited

U.S. PATENT DOCUMENTS

| | | | |
|---|---|---|---|
| 2010/0152896 A1* | 6/2010 | Komatsu | B25J 13/085 700/258 |
| 2020/0247539 A1* | 8/2020 | Shoemaker, Jr. | B64D 1/12 |
| 2020/0316781 A1* | 10/2020 | Lee | B25J 9/1612 |
| 2021/0291378 A1* | 9/2021 | Komoda | B25J 15/0616 |
| 2022/0315358 A1* | 10/2022 | Ryan | B25J 9/1697 |
| 2024/0246764 A1* | 7/2024 | Kalouche | B65G 1/1371 |

FOREIGN PATENT DOCUMENTS

| | | | | |
|---|---|---|---|---|
| DE | 102014202977 B4 * | 3/2025 | | G01B 21/047 |
| JP | 3828722 B2 | 10/2006 | | |
| JP | 6435400 B2 | 12/2018 | | |
| WO | 2016/142981 A1 | 9/2016 | | |
| WO | 2017/037967 A1 | 3/2017 | | |

* cited by examiner

*Primary Examiner* — Adam R Mott
*Assistant Examiner* — Alan Lindsay Ostrow
(74) *Attorney, Agent, or Firm* — Oliff PLC

(57) ABSTRACT

A holding device includes: a grip portion that holds a side surface of one side of a workpiece; a supporting portion that supports the grip portion and moves the workpiece; a detection unit that detects a force applied to the grip portion; and a control unit that controls an angle of the supporting portion with respect to the ground such that a force detected by the detection unit does not exceed a threshold value when the supporting portion moves the workpiece.

11 Claims, 10 Drawing Sheets

HOLDING DEVICE, HOLDING METHOD, AND STORAGE MEDIUM

CROSS-REFERENCE TO RELATED APPLICATION

This application claims priority to Japanese Patent Application No. 2022-120976 filed on Jul. 28, 2022, incorporated herein by reference in its entirety.

BACKGROUND

1. Technical Field

The present disclosure relates to a holding device, a holding method, and a storage medium.

2. Description of Related Art

Robots have been developed to provide a working robot capable of holding each article having a length in a depth direction that is lined with other articles and stored in a shelf. WO 2016/142981 discloses a robot including a grip portion that holds an article and a projection portion arranged on the gravitational direction side with respect to the grip portion.

SUMMARY

However, in the robot of the above-mentioned document, the article has to be in contact with both the grip portion and the protrusion portion, and a large contact surface is required, which limits the article. It is therefore an object of the present disclosure to provide a holding device that holds a wide variety of articles, such as small articles.

A holding device according to the present disclosure is a holding device that includes: a grip portion that holds one side surface of a workpiece; a supporting portion that supports the grip portion and moves the workpiece; a detection unit that detects a force applied to the grip portion; and a control unit that controls an angle of the supporting portion with respect to a ground such that the force detected by the detection unit does not exceed a threshold value when the supporting portion moves the workpiece.

The holding device according to the present disclosure can hold a wide variety of articles, such as small articles.

The holding device according to the present disclosure is the holding device in which the supporting portion includes a robot arm.

The holding device according to the present disclosure can be applied to a robot including an arm portion.

The holding device according to the present disclosure is the holding device in which the supporting portion includes a drone.

The holding device according to the present disclosure can be applied to a drone.

The holding device according to the present disclosure is the holding device in which the detection unit includes a force sensor attached to the grip portion.

In the holding device according to the present disclosure, the detection unit includes the force sensor attached to the grip portion. With such a force sensor, it is possible to detect a force applied to the grip portion.

The holding device according to the present disclosure is the holding device in which the detection unit includes a load sensor attached to the grip portion.

In the holding device according to the present disclosure, the detection unit includes the load sensor attached to the grip portion. With such a load sensor, it is possible to detect a force applied to the grip portion.

The holding device according to the present disclosure is the holding device in which the detection unit includes a force sensor attached to the supporting portion.

In the holding device according to the present disclosure, the detection unit includes the force sensor attached to the supporting portion. With such a force sensor, it is possible to detect a force applied to the grip portion.

The holding device according to the present disclosure is the holding device in which the detection unit detects a force applied to a drive motor portion attached to the supporting portion.

In the holding device according to the present disclosure, the detection unit can detect the force applied to the drive motor portion attached to the supporting portion.

The holding device according to the present disclosure is the holding device in which the detection unit includes a learned model that has learned using images of the workpiece and the grip portion and a force measurement value, and the detection unit estimates the force applied to the grip portion based on the image of the workpiece captured by an image capturing unit and the image of the grip portion.

In the holding device according to the present disclosure, the detection unit can estimate the force applied to the grip portion based on the image of the workpiece captured by an internal or external image capturing unit and the image of the grip portion.

The holding device according to the present disclosure is the holding device in which a weight or a pull-out load of the workpiece is registered in the control unit, and the control unit controls the angle of the supporting portion with respect to the ground based on the weight or the pull-out load of the workpiece.

The supporting portion can hold the workpiece at an angle suitable for the weight when the angle of the supporting portion is controlled corresponding to the registered weight or pull-out load of the workpiece.

The holding device according to the present disclosure is the holding device that further includes an image capturing unit that is connected to the control unit and captures an image of the workpiece, and in which the control unit calculates a surface area of the side surface of the workpiece from the image of the workpiece captured using the image capturing unit, and a volume of the workpiece is registered in the control unit, and the control unit calculates a depth of the workpiece from the volume of the workpiece and the surface area of the side surface and controls the angle of the supporting portion with respect to the ground based on the depth of the workpiece.

The supporting portion can hold the workpiece at an angle suitable for the depth of the workpiece when the angle of the supporting portion is controlled corresponding to the depth of the workpiece.

A holding method of the present disclosure is a holding method that includes: a step of holding one side surface of a workpiece by a grip portion; a step of supporting the grip portion and moving the workpiece by a supporting portion; a step of detecting a force applied to the grip portion by a detection unit; and a step of controlling an angle of the supporting portion with respect to a ground by a control unit such that the force detected by the detection unit does not exceed a threshold value when the supporting portion moves the workpiece.

According to the holding method of the present disclosure, a wide variety of articles, such as small articles, can be held.

A storage medium according to the present disclosure storing a program, and the program causes a holding device to execute processes including: a step of holding one side surface of a workpiece by a grip portion; a step of supporting the grip portion and moving the workpiece by a supporting portion; a step of detecting a force applied to the grip portion by a detection unit; and a step of controlling an angle of the supporting portion with respect to a ground by a control unit such that the force detected by the detection unit does not exceed a threshold value when the supporting portion moves the workpiece.

The program stored in the storage medium according to the present disclosure can provide a holding device capable of holding a wide variety of articles such as small articles.

The present disclosure can provide a holding device capable of holding a wide variety of articles such as small articles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Figure 1:
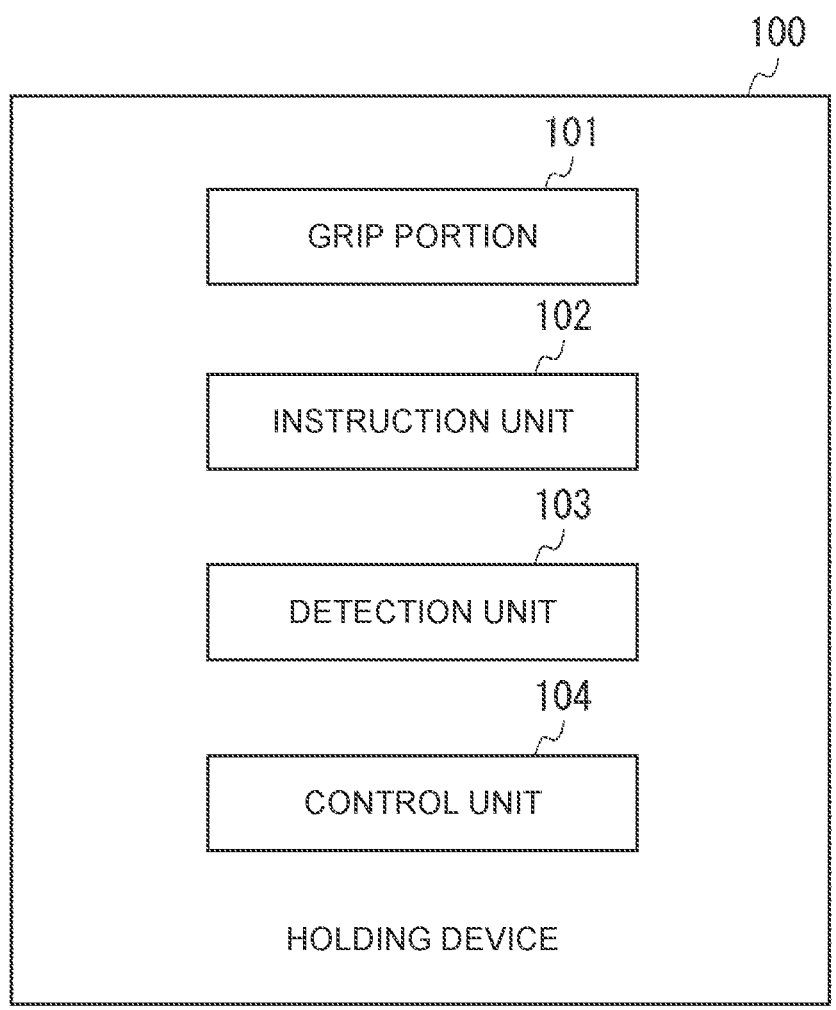
FIG. 1 is a block diagram of a holding device according to an embodiment.

Hereinafter, embodiments of the present disclosure will be described with reference to the drawings. However, the disclosure according to the claims is not limited to the following embodiments. Further, not all of the configurations described in the embodiments are essential as means for solving the problem. In order to clarify the explanation, the following description and drawings have been omitted or simplified as appropriate. In each drawing, the same elements are designated by the same reference signs, and duplicate explanations are omitted as necessary.
Description of the Holding Device According to the Embodiment FIG. 1 is a block diagram of a holding device according to an embodiment. With reference to FIG. 1, a holding device 100 according to an embodiment will be described. The holding device 100 can hold and move, for example, a workpiece 301 stored in a shelf.

As illustrated in FIG. 1, the holding device 100 according to the embodiment includes a grip portion 101, a supporting portion 102, a detection unit 103, and a control unit 104.

First, a workpiece 301 (shown in FIG. 3) to be moved will be described. The workpiece 301 includes an adsorption surface or an adhesion surface that is adsorbed or adhered to the grip portion 101. The adsorption surface or the adhesive surface is preferably a flat surface, but may be a curved surface. The workpiece 301 is preferably a rectangular parallelepiped or a cube. The workpiece 301 is an article stored in a shelf, and is moved from the shelf to a shelf or a predetermined position.

The grip portion 101 holds the side surface of the workpiece 301 by suction, adhesion, or the like. In the case of suction, the grip portion 101 is a vacuum pad connected to a vacuum pump. In the case of electromagnetic adsorption, the grip portion 101 is an electromagnet such as a coil. The grip portion 101 may be formed of an adhesive, a cloth tape, or the like.

The supporting portion 102 includes a grip portion 101 at a distal end thereof. The supporting portion 102 supports the grip portion 101 and is configured to change the holding posture. For example, the supporting portion 102 has three or six degrees of freedom. The supporting portion 102 can move the workpiece 301 held by the grip portion 101.

The detection unit 103 is attached to the grip portion 101. The detection unit 103 detects a force applied to the grip portion 101 when the workpiece 301 is lifted. The detection unit 103 may include a force sensor or a load sensor.

The control unit 104 controls the supporting portion 102 at a direction and a speed at which the grip portion 101 is not detached from the workpiece 301 from the force applied to the grip portion 101 detected by the detection unit 103. When the supporting portion 102 moves the workpiece 301, the control unit 104 calculates the moment of the workpiece 301 due to the gravitational force applied to the workpiece 301 so that the force detected by the detection unit 103 does not exceed the threshold value, and controls the tilting of the workpiece 301 with respect to the ground. This prevents the grip portion 101 from being detached from the workpiece 301. Here, the control unit 104 is included in the same holding device 100, but the control unit 104 may be disposed in a central control facility or the like, and may operate the holding device 100 remotely.

In order to change the angle of the workpiece 301 with respect to the ground, the control unit 104 controls the posture of the supporting portion 102 and the posture of the grip portion 101 in addition to the angle of the supporting portion 102. The attitude includes not only the angle with respect to the ground but also the change information of the pitch information of the change, and the change information of the position information (x-axis, y-axis, z-axis, roll, pitch, yaw) of the three-dimensional or two-dimensional space.

Figure 2:
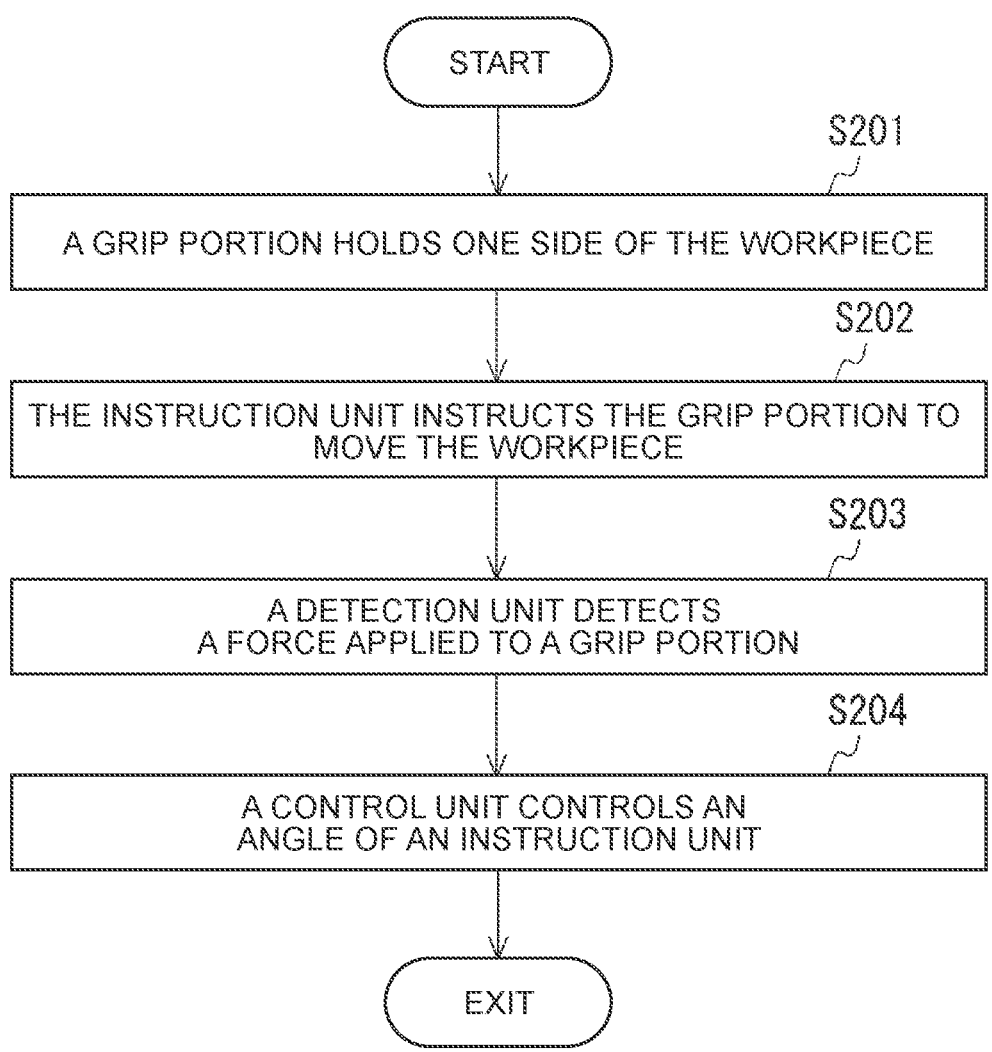
FIG. 2 is a flowchart of a workpiece holding method according to the embodiment.

FIG. 2 is a flowchart of a workpiece holding method according to the embodiment. For example, the holding method of the workpiece according to the embodiment is executed by the holding device 100 of FIG. 1. As shown in FIG. 2, first, the grip portion 101 holds one side surface of the workpiece 301 (step-wise S201). Next, the supporting portion 102 supports the grip portion 101 and moves the workpiece 301 (step S202). Next, the detection unit detects the force applied to the grip portion 101 (step S203). Finally, the control unit 104 controls the angle of the supporting portion 102 (step S204) and the process ends.

As described above, in the holding device 100 according to the embodiment, the control unit 104 controls the angle of the supporting portion 102 to hold and move the workpiece 301. This allows a wide variety of articles, such as small articles, to be retained.

Figure 3:
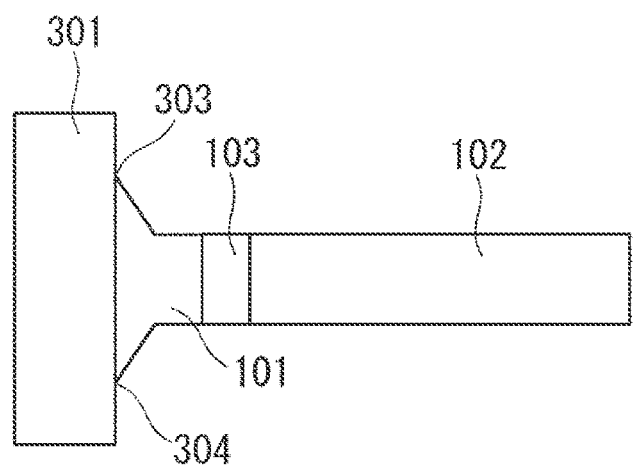
FIG. 3 is a view for holding a workpiece according to the embodiment.
Figure 3:
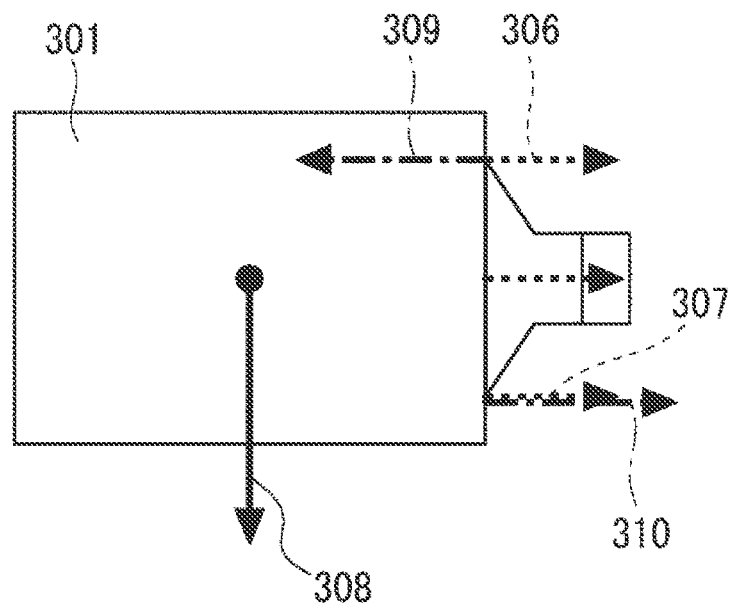
Figure 4:
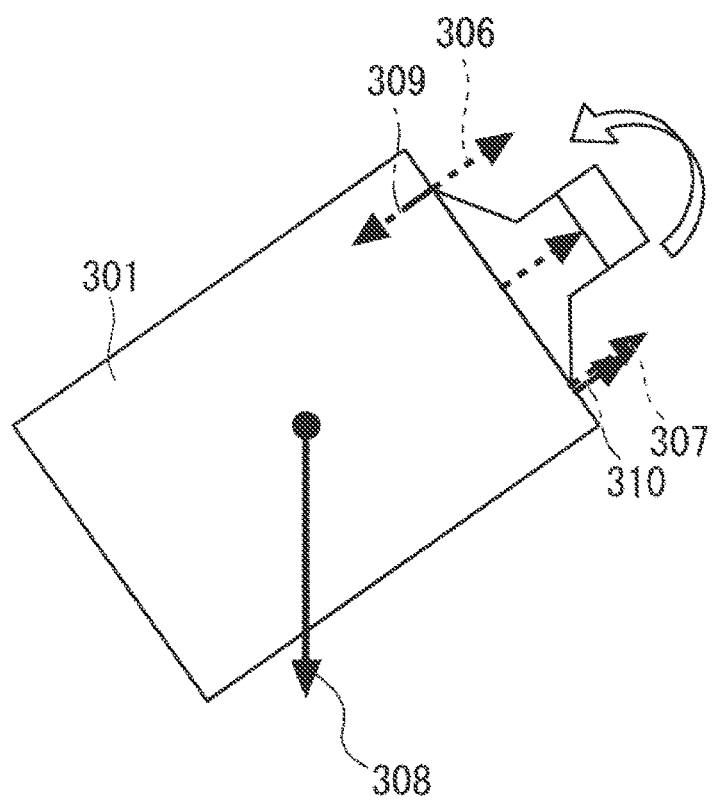
FIG. 4 is a view illustrating holding a workpiece according to the embodiment while being inclined with respect to the ground.

Description of the Principle of Holding the Workpiece in an Inclined Manner According to the Embodiment FIG. 3 is a view for holding a workpiece according to the embodiment. FIG. 4 is a view illustrating a workpiece according to the embodiment being held while being inclined with respect to the ground. With reference to FIGS. 3 and 4, the principle of holding the workpiece in an inclined manner according to the embodiment will be described.

As shown in the left view of FIG. 3, the workpiece 301 is adsorbed or adhered to the grip portion 101. The detection unit 103 is attached to the grip portion 101. A supporting portion 102 is attached to the detection unit 103. The grip portion 101 includes an upper portion 303 of the grip portion and a lower portion 304 of the grip portion. As shown in the right figure of FIG. 3, when the workpiece 301 attracted by the grip portion 101 is to be lifted while being pulled out, gravity 308 acts, and therefore, an upper inertial moment 309 acts on the upper portion 303 of the grip portion in the direction of the workpiece 301, and a lower inertial moment 310 acts on the lower portion 304 of the grip portion in the direction of the grip portion 101. An upper suction force 306 acts on the upper portion 303 of the grip portion, and a lower suction force 307 acts on the lower portion 304 of the grip portion. When the upper suction force 306 at the upper portion is balanced with the upper inertial moment 309, however, when the inertia moment 309 at the upper portion is higher than the upper suction force 306 at the upper portion, the grip portion 101 is detached from the workpiece 301.

As shown in FIG. 4, when the workpiece 301 is inclined with respect to the ground, the upper inertial moment 309 and the lower inertial moment 310 due to the gravity 308 are reduced. Therefore, even if the upper suction force 306 of the grip portion 101 and the lower suction force 307 are the same as before the inclination, the grip portion 101 does not separate from the workpiece 301.

Thus, it can be seen that by tilting the workpiece 301 with respect to the ground, the grip portion 101 does not come off from the workpiece 301.

Description of the Holding Device According to Embodiment 1

Figure 5:
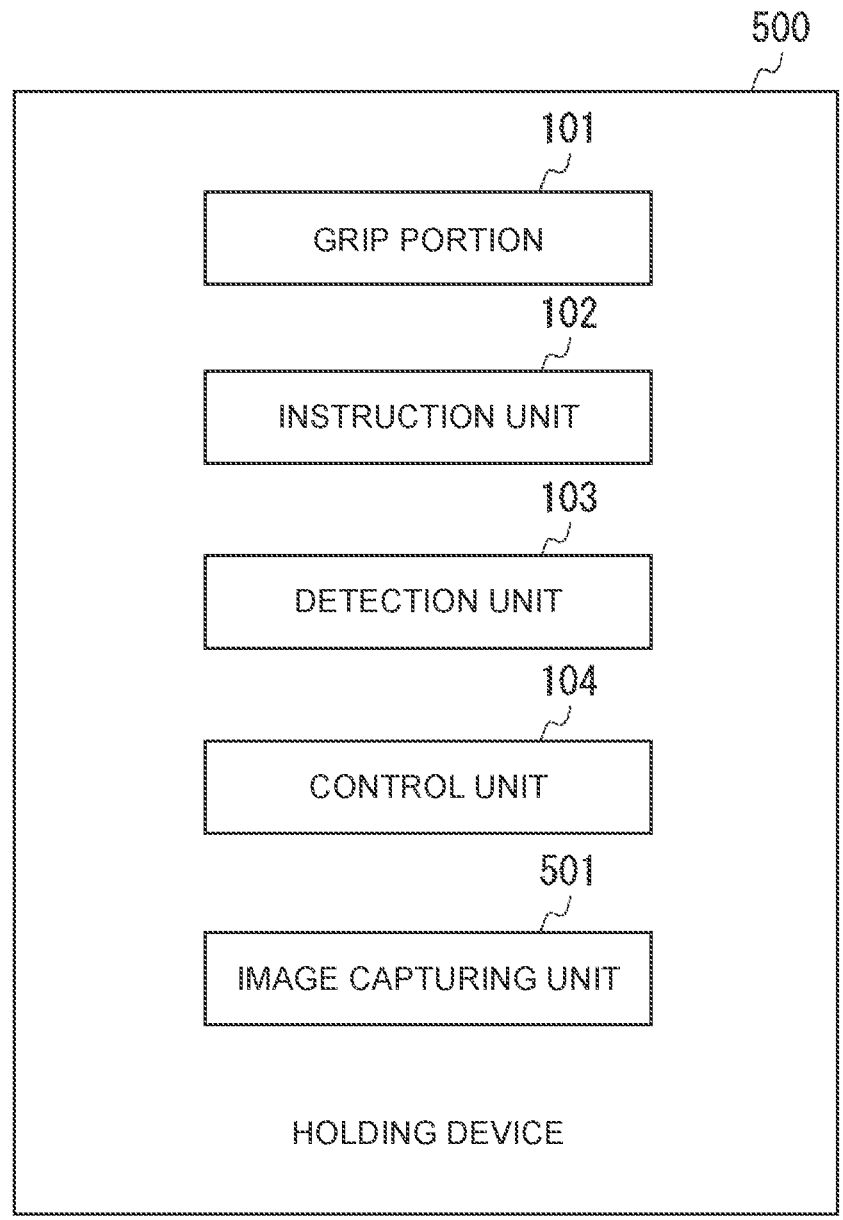
FIG. 5 is a block diagram of a holding device according to Embodiment 1.

FIG. 5 is a block diagram of a holding device according to Embodiment 1. Referring to FIG. 5, a holding device according to Embodiment 1 will be described.

The holding device 500 according to the first embodiment includes a grip portion 101, a supporting portion 102, a detection unit 103, a control unit 104, and an image capturing unit 501. The holding device 500 according to the first embodiment is different from the holding device 100 according to the first embodiment in that data of a workpiece is input to the control unit 104 in advance, and in that an image capturing unit 501 is provided. Descriptions of points that overlap with the embodiments will be omitted.

In the control unit 104, the weight or the pull-out load of the workpiece 301 is registered in advance. By doing so, it is possible to estimate an angle at which the workpiece 301 is inclined with respect to the ground when the workpiece 301 is pulled out from the shelf.

The control unit 104 is connected to the image capturing unit 501. The image capturing unit 501 captures an image of a side surface to which the workpiece 301 is adsorbed or adhered. The control unit 104 calculates the surface area of the side surface of the workpiece 301 from the image of the workpiece 301. The volume of the workpiece 301 is registered in the control unit 104 in advance. The control unit 104 calculates the depth of the workpiece 301 from the volume and the surface area of the workpiece 301. The control unit 104 can control the angle at which the workpiece 301 is inclined with respect to the ground based on the depth of the workpiece 301.

A Holding Method of a Workpiece According to Embodiment 1 Will be Described

Figure 6:
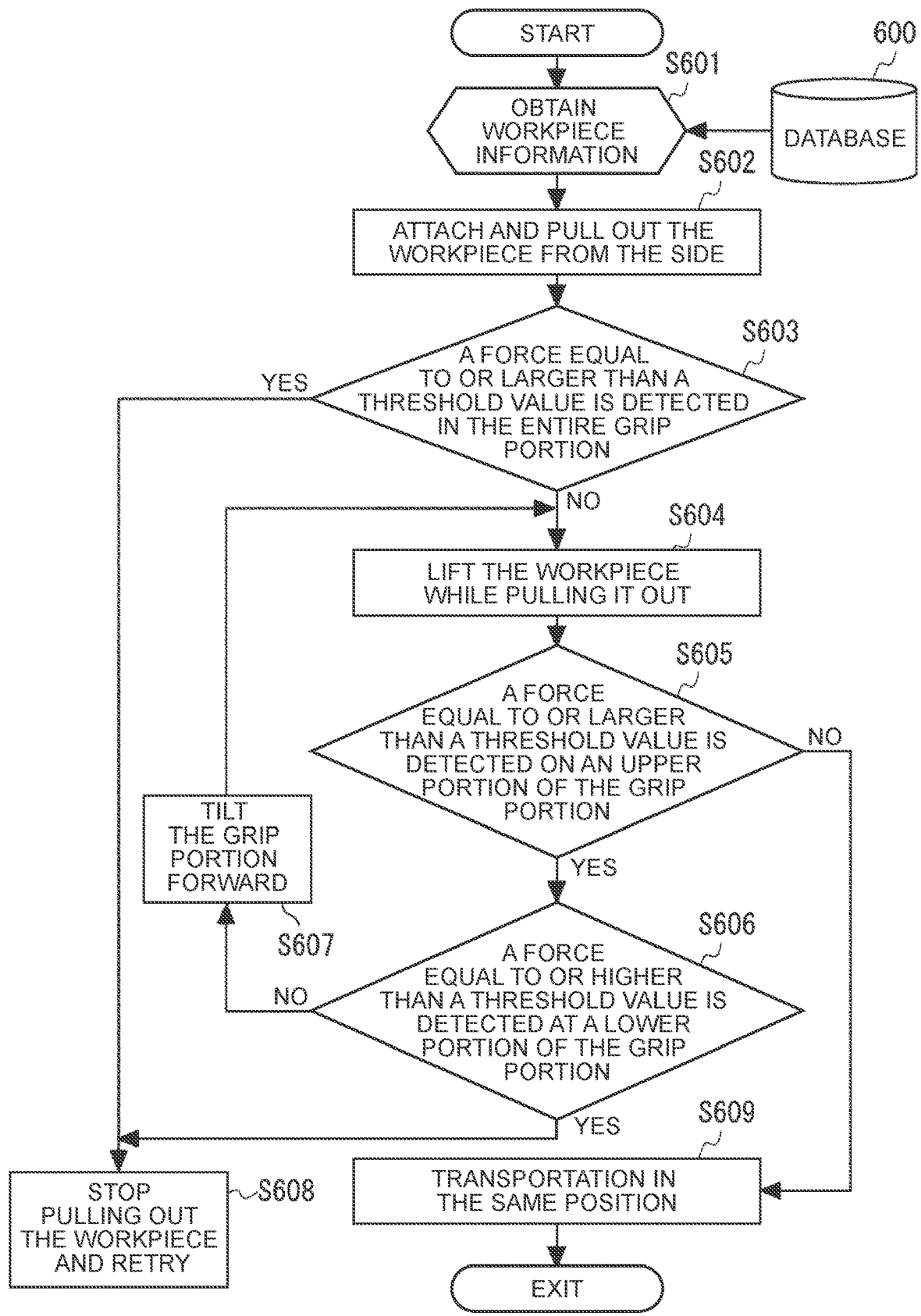
FIG. 6 is a flowchart of a workpiece holding method according to Embodiment 1.

FIG. 6 is a flowchart of a workpiece holding method according to Embodiment 1. A holding method of a workpiece according to Embodiment 1 will be described with reference to FIG. 6.

First, workpiece data is acquired (step-wise S601). The control unit 104 acquires information such as the weight, the pull-out load, and the volume of the workpiece 301 from the database 600 in advance. For example, the control unit 104 may acquire the workpiece information by the user inputting information about the workpiece. Alternatively, the control unit 104 may acquire the workpiece information by specifying the workpiece 301 from the image of the workpiece 301 by the image processing. The image capturing unit 501 captures an image of the side surface of the workpiece 301. The surface area may be calculated from the captured image of the side surface, and the depth of the workpiece 301 may be calculated. These data are used in a step (step S607) in which the grip portion 101 is tilted forward.

Next, the workpiece 301 is sucked from the side and pulled out (step S602). The grip portion 101 is attracted to one side surface of the workpiece 301 stored in a rack or the like. The grip portion 101 holds only one of the side surfaces of the workpiece 301. Thereafter, the supporting portion 102 supporting the grip portion 101 pulls out the workpiece in order to move the workpiece 301.

Next, it is determined whether or not a force equal to or greater than a threshold value is detected in the entire grip portion 101 (step S603). The force is detected by a detection unit 103 provided in the grip portion 101. The force equal to or greater than the threshold value is determined based on whether or not the grip portion 101 has enough force to detach from the workpiece 301.

If a force equal to or greater than the threshold value is detected (YES in step S603), the workpiece 301 is stopped and tried again (step S608). The picking is stopped once, and if possible, the picking process is repeated again.

If no force greater than the threshold value is detected (in NO of step S603), the workpiece 301 is lifted while being withdrawn (step S604). This step is slowly performed while detecting the force applied to the grip portion 101.

Next, it is determined whether or not a force equal to or greater than a threshold value is detected in the upper portion 303 of the grip portion (step S605). When a force equal to or greater than the threshold value is not detected (in NO of step S605), the vehicle is conveyed in its attitude (step S609). This is because the grip portion 101 is not likely to be peeled off from the workpiece 301.

When a force equal to or greater than the threshold value is detected in the upper portion 303 of the grip portion (YES in step S605), it is determined whether or not a force equal to or greater than the threshold is detected in the lower portion 304 of the grip portion (step S606). When a force equal to or greater than the threshold value is detected in the lower portion 304 of the grip portion (YES in step S606), the withdrawal of the workpiece 301 is stopped and tried again (step S608). This is because the grip portion 101 may be peeled off from the workpiece 301 even if the workpiece 301 is tilted.

When a force equal to or greater than the threshold value is not detected in the lower portion of the grip portion 101 (NO in the step S606), the grip portion 101 is tilted forward (step S607). The grip portion 101, i.e., the workpiece 301, can be angled relative to the ground. In this way, the force applied to the grip portion 101 is reduced.

After the grip portion 101 is tilted forward, the workpiece 301 is lifted while being pulled out (step S604). Thereafter, the supporting portion 102 repeats pulling out (step S604) of the workpiece 301 and forward tilting (step S607) of the grip portion 101 until the workpiece 301 is held at an appropriate angle with respect to the ground. When the angle is appropriate, the supporting portion 102 moves the workpiece 301.

Figure 7:
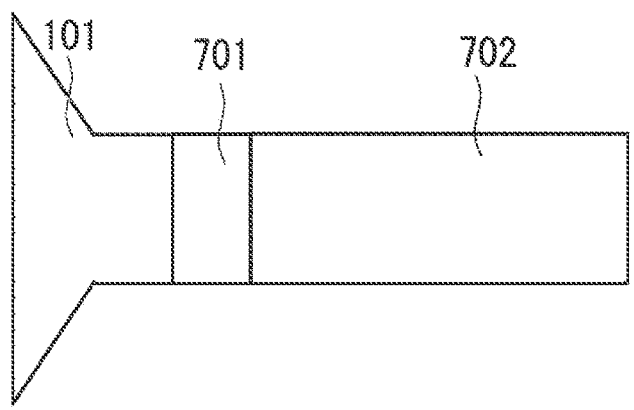
FIG. 7 is a schematic view of a grip portion and a detection unit according to the embodiment.
Figure 8:
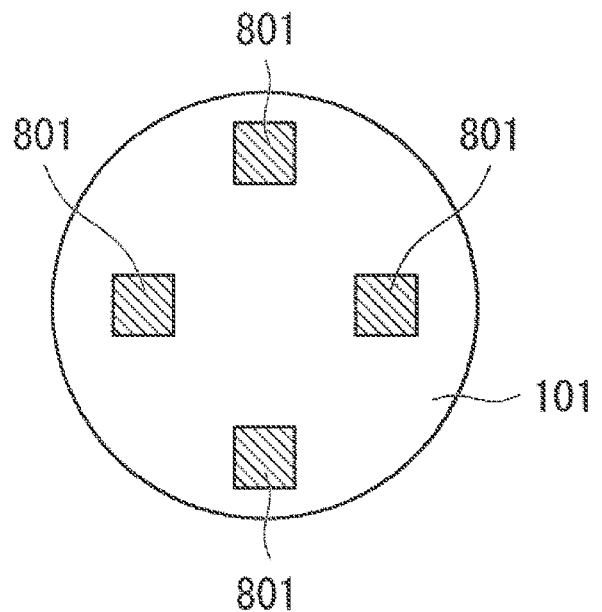
FIG. 8 is a schematic view of a grip portion and a detection unit according to another embodiment.
Figure 9:
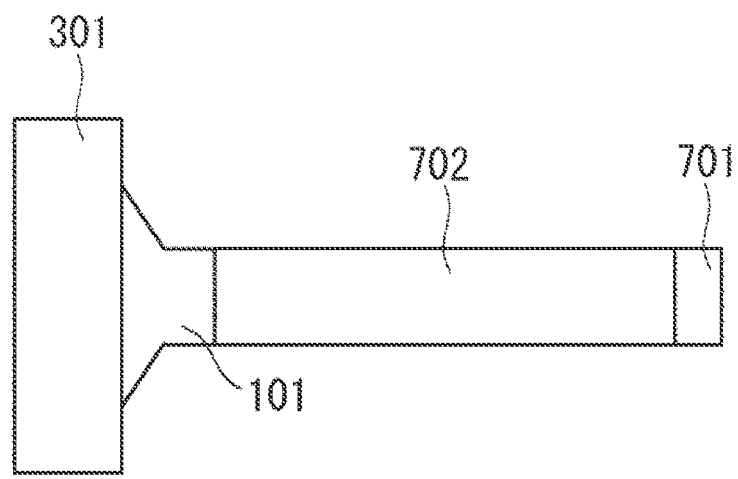
FIG. 9 is a schematic diagram of a detection unit according to another embodiment.
Figure 10:
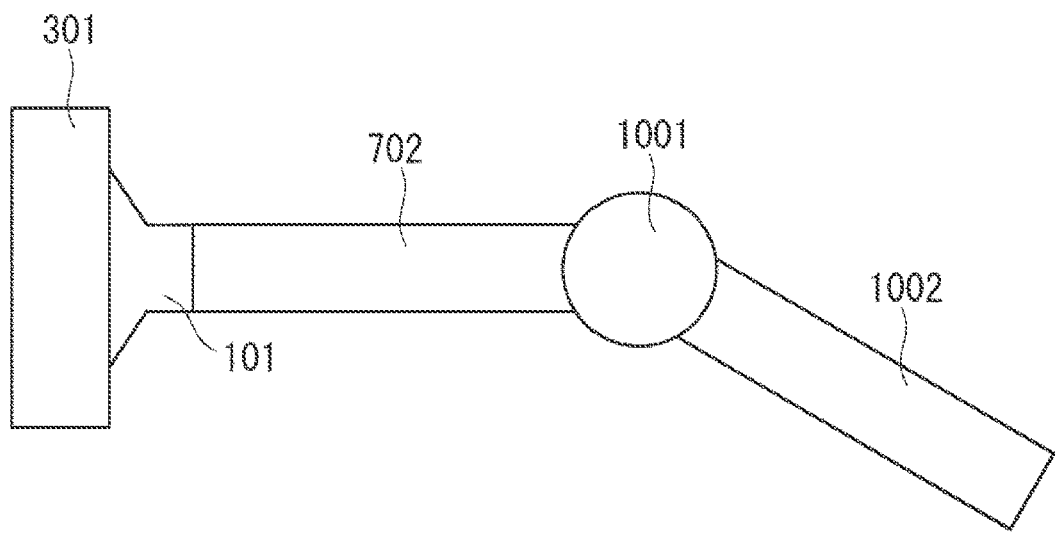
FIG. 10 is a schematic diagram of a detection unit according to yet another embodiment.
Figure 11:
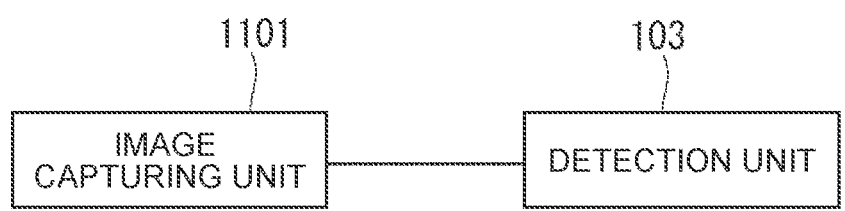
FIG. 11 is a block diagram of a detection unit according to yet another embodiment.

Description of the Detection Unit Attached to or Not Attached to the Grip Portion According to the Embodiment FIG. 7 is a schematic diagram of a grip portion and a detection unit according to the embodiment. FIG. 8 is a schematic view of a grip portion and a detection unit according to another embodiment. FIG. 9 is a schematic diagram of a detection unit according to another embodiment. FIG. 10 is a schematic diagram of a detection unit according to yet another embodiment. FIG. 11 is a block diagram of a detection unit according to yet another embodiment. Referring to FIGS. 7 to 11, a detection unit attached to or not attached to a grip portion according to an embodiment will be described.

As illustrated in FIG. 7, the detection unit 103 according to the embodiment is a force sensor 701 provided at the root of the grip portion 101. The force sensor 701 is a sensor capable of measuring in real time the magnitude of a force or torque acting in a plurality of directions. The force sensor 701 may be of three axes that measure the force of XYZ in three directions, or of six axes that measure the torques around the respective axes. The force sensor 701 can be resistive, capacitive, piezoelectric, and optical.

The force sensor 701 has a supporting portion 102 attached thereto. Here, the supporting portion 102 is the robot arm 702. The robot arm 702 is attached to a robot or a fixed portion which is a traveling moving body.

As shown in FIG. 8, the detection unit 103 according to another embodiment is a load sensor 801 attached to the suction surface or the adhesive surface of the grip portion 101. The load sensor 801 can measure both compression and tension. Since the supporting portion 102 operates in three or six axes and the grip portion 101 rotates, the load sensor 801 is also preferably mounted in four directions. In this way, it is possible to correspond to the workpiece 301 which is adsorbed or adhered to the grip portion 101 in any direction. In this case, the supporting portion 102 is attached to the grip portion 101.

As illustrated in FIG. 9, a detection unit 103 according to another embodiment is a force sensor 701 attached to an end portion of a robot arm. The force sensor 701 is attached to the end of the robot arm 702 opposite the end to which the grip portion 101 is attached. Since the robot arm 702 and the grip portion 101 are fixed, the force sensor 701 can detect a force applied to the workpiece 301. In this way, it is possible to detect the force applied to the grip portion 101 by the detection unit 103 that is not attached to the grip portion 101.

As illustrated in FIG. 10, the detection unit 103 according to still another embodiment is connected to the robot arm 702 and another robot arm 1002, the robot itself such as a traveling moving body, or a drive motor portion 1001 that connects a fixed portion. The detection unit 103 detects a force applied to the drive motor portion 1001, and the detection unit 103 detects a force applied to the grip portion 101 to hold the workpiece 301. The detection unit 103 is an arithmetic unit that calculates a load from a load applied to the drive motor portion 1001. In this way, it is possible to detect the force applied to the grip portion 101 by the detection unit 103 that is not attached to the grip portion 101.

As illustrated in FIG. 11, a detection unit 103 according to still another embodiment is connected to an image capturing unit 1101. The image capturing unit 1101 may be inside or outside the holding device 100. The image capturing unit 1101 may be the same as or different from the image capturing unit 501 of the holding device 500. The image capturing unit 1101 captures an image of the workpiece 301 and the grip portion 101. The detection unit 103 includes a learned learning model in which images of the workpiece 301 and the grip portion 101 are captured in advance, and a force measurement value that is a force applied to the grip portion 101 is used as teacher data. Therefore, the detection unit 103 can estimate the force applied to the grip portion 101 from the image of the workpiece 301 and the grip portion 101 captured by the image capturing unit 1101. In this way, it is possible to detect the force applied to the grip portion 101 by the detection unit 103 that is not attached to the grip portion 101.

Description of a Supporting Portion According to Another Embodiment

Figure 12:
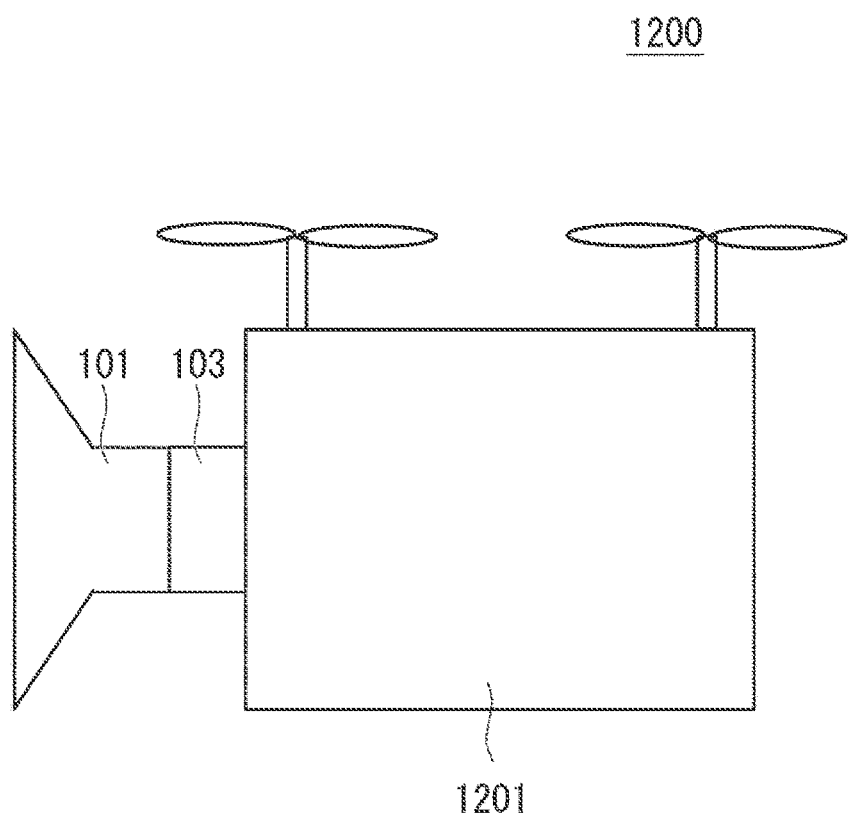
FIG. 12 is a schematic view of a holding device according to another embodiment.

FIG. 12 is a schematic view of a holding device according to another embodiment. With reference to FIG. 12, a supporting portion according to an embodiment will be described.

As illustrated in FIG. 12, the holding device 1200 includes a grip portion 101, a detection unit 103, and a drone 1201. The holding device 1200 is different from the above-described embodiment in that the supporting portion 102 is the drone 1201.

In the above-described embodiment, the supporting portion 102 is a robot arm attached to the traveling moving body or attached to the fixed portion. However, the supporting portion 102 of the present embodiment is the drone 1201. Therefore, the drone 1201 changes the angle of the workpiece 301 with respect to the ground by changing the attitude with respect to the ground while flying.

In addition, some or all of the processing in the holding devices 100 and 500 described above can be realized as a computer program. The program as described above is stored using various types of non-transitory computer-readable media, and can be supplied to a computer. The non-transitory computer-readable media include various types of tangible recording media. Exemplary non-transitory computer-readable media include magnetic recording media (e.g., flexible disks, magnetic tapes, hard disk drives), magneto-optical recording media (e.g., magneto-optical disks), Read Only Memory (CD-ROM), CD-R, CD-R/W, solid-state memories (e.g., masking ROM, Programmable ROM (PROM), Erasable PROM (EPROM), flash ROM, Random Access Memory (RAM). Further, the program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The program may cause the holding devices 100 and 500 to execute a step of holding a side surface of the workpiece by the grip portion, a step of moving the workpiece by supporting the grip portion by the supporting portion having the grip portion at the tip, a step of detecting a force applied to the grip portion by the detection unit, and a step of controlling an angle of the supporting portion with respect to the ground by the control unit such that the force detected by the detection unit does not exceed a threshold value when the supporting portion moves the workpiece.

The present disclosure is not limited to the above embodiment, and can be appropriately modified without departing from the spirit.

What is claimed is:

1. A holding device comprising:
a grip portion that holds one side surface of a workpiece;
a supporting portion that supports the grip portion and moves the workpiece;
a detection unit that detects a force applied to the grip portion;
a control unit that controls an angle of the supporting portion with respect to a ground such that the force detected by the detection unit does not exceed a threshold value when the supporting portion moves the workpiece; and
an image capturing unit that is connected to the control unit and captures an image of the workpiece, wherein:
the control unit calculates a surface area of the side surface of the workpiece from the image of the workpiece captured using the image capturing unit; and
a volume of the workpiece is registered in the control unit, and the control unit calculates a depth of the workpiece from the volume of the workpiece and the surface area of the side surface and controls the angle of the supporting portion with respect to the ground based on the depth of the workpiece.

2. The holding device according to claim 1, wherein the supporting portion includes a robot arm.

3. The holding device according to claim 1, wherein the supporting portion includes a drone.

4. The holding device according to claim 1, wherein the detection unit includes a force sensor attached to the grip portion.

5. The holding device according to claim 1, wherein the detection unit includes a load sensor attached to the grip portion.

6. The holding device according to claim 1, wherein the detection unit includes a force sensor attached to the supporting portion.

7. The holding device according to claim 1, wherein the detection unit detects a force applied to a drive motor portion attached to the supporting portion.

8. The holding device according to claim 1, wherein:
the detection unit includes a learned model that has learned using images of the workpiece and the grip portion and a force measurement value; and
the detection unit estimates the force applied to the grip portion based on the image of the workpiece captured by the image capturing unit and the image of the grip portion.

9. The holding device according to claim 1, wherein a weight or a pull-out load of the workpiece is registered in the control unit, and the control unit controls the angle of the supporting portion with respect to the ground based on the weight or the pull-out load of the workpiece.

10. A holding method comprising:
a step of holding one side surface of a workpiece by a grip portion;
a step of supporting the grip portion and moving the workpiece by a supporting portion;
a step of detecting a force applied to the grip portion by a detection unit;
a step of controlling an angle of the supporting portion with respect to a ground by a control unit such that the force detected by the detection unit does not exceed a threshold value when the supporting portion moves the workpiece; and
a step of capturing an image of the workpiece with an image capturing unit that is connected to the control unit, wherein:
the control unit calculates a surface area of the side surface of the workpiece from the image of the workpiece captured using the image capturing unit; and
a volume of the workpiece is registered in the control unit, and the control unit calculates a depth of the workpiece from the volume of the workpiece and the surface area of the side surface and controls the angle of the supporting portion with respect to the ground based on the depth of the workpiece.

11. A non-transitory storage medium storing a program causing a holding device to execute processes including:
a step of holding one side surface of a workpiece by a grip portion;
a step of supporting the grip portion and moving the workpiece by a supporting portion;
a step of detecting a force applied to the grip portion by a detection unit; and
a step of controlling an angle of the supporting portion with respect to a ground by a control unit such that the force detected by the detection unit does not exceed a threshold value when the supporting portion moves the workpiece; and
a step of capturing an image of the workpiece with an image capturing unit that is connected to the control unit, wherein:
the control unit calculates a surface area of the side surface of the workpiece from the image of the workpiece captured using the image capturing unit; and
a volume of the workpiece is registered in the control unit, and the control unit calculates a depth of the workpiece from the volume of the workpiece and the surface area of the side surface and controls the angle of the supporting portion with respect to the ground based on the depth of the workpiece.

* * * * *